United States Patent Office 2,753,258
Patented July 3, 1956

2,753,258

METHOD OF RECOVERING GOLD FROM CYANIDE SOLUTIONS

Francis Hereward Burstall and Phyllis Joan Forrest, Hampton Hill, and Norman Frank Kember, London, and Ronald Alfred Wells, Carshalton, England, assignors to The National Research Development Corporation, London, England No Drawing. Application January 19, 1953, Serial No. 332,116

15 Claims. (Cl. 75—118)

This invention relates to the recovery of gold from aqueous cyanide solutions, and in particular from such solutions containing in addition other metals, especially iron and copper as impurities.

It has been reported by Sussman, Nachod and Wood in Industrial Engineering Chemistry, volume 37, p. 618 (1945), that gold in the form of the chloroaurate ion is adsorbed by an anion exchange resin, the gold being recovered by ashing the resin. In addition the adsorption of gold from cyanide solutions has been investigated by S. J. Hussey of the United States Bureau of Mines (R. I. Bureau of Mines, January 1949) employing a weakly basic resin known as "Amberlite IR-4B" and by Sara E. Bailey (Memo on the Recovery of Gold from Basic Cyanide Solution by Anion Exchange Resin—American Cyanamid Co., July 1951) using an intermediate base anion exchange resin known as "Ionac A-300" and a strongly basic resin known as "Amberlite IRA-400," but no success was achieved in completely eluting the adsorbed gold.

Tests by us of anion exchange resins for the treatment of cyanide solutions, such as are likely to be met in commercial cyanide processes for recovery of gold, gave results in agreement with those of workers referred to above, only partial removal of gold being obtained by elution with aqueous solutions; and it was observed that adsorbed complexes of iron, copper and zinc were eluted with the portion of the gold removed.

The object of the present invention is to provide a process for the recovery of gold, and silver, if present, from aqueous cyanide solutions employing anion exchange substances, which process will permit of recoveries of gold of up to 100 per cent of that adsorbed on the resin and will allow of separate removal of iron, zinc and copper present as impurities.

In accordance with the invention gold adsorbed as aurocyanide on an anion exchange substance is recovered from the substance by elution with an organic solvent containing a minor proportion of an inorganic acid. Also in accordance with the invention a method of recovering gold adsorbed as aurocyanide on a strongly basic anion exchange substance together with impurities especially copper and/or iron comprises eluting impurities with an aqueous alkali metal cyanide solution and then recovering gold by eluting the anion exchange substance.

Also in accordance with the invention a method of recovering gold adsorbed as aurocyanide on a strongly basic anion exchange substance, together with impurities, comprises eluting the anion exchange substance with an aqueous inorganic acid solution, then eluting the anion exchange substance with an aqueous alkali metal cyanide solution to extract at least part of the impurities and then recovering gold by eluting the anion exchange substance with an organic solvent containing a minor proportion of an inorganic acid.

Strongly basic anion exchange substances employed may be artificial resins of the amine type, preferably that known as "Amberlite IRA-400."

The preferred organic solvent is acetone and the inorganic acid is hydrochloric acid (1.1 s. g.), the preferred amount of acid being 5 per cent by volume. A small amount of water, for example 5 per cent by volume may also be present. Ethyl acetate to which is added 10 per cent by volume of nitric acid (1.5 s. g.) and 5 per cent water, and ethyl alcohol to which is added 10 per cent hydrochloric acid (1.1 s. g.) have given recoveries of over 90 per cent of gold adsorbed on anion exchange resins, and methanol to which is added 10 per cent by volume of hydrochloric acid (1.1 s. g.) has given between 80 and 90 per cent recovery of such adsorbed gold. Recovery of 99.5 to 100 per cent of adsorbed gold has been obtained when using the preferred organic solvent acetone to which is added 5 per cent by volume of each of hydrochloric acid and water.

When copper and/or iron are present with the gold on a strongly basic anion exchange resin, a preliminary elution with an alkali metal cyanide in aqueous solution, for example sodium cyanide M or 2 M solution, will usually serve to remove the greater parts of those elements from the resin without any appreciable loss of gold. If the copper content substantially exceeds the gold content a 2 M sodium cyanide solution has been found satisfactory for this purpose.

If nickel and/or zinc are present with the gold on the anion exchange resin a dilute aqueous mineral acid solution, for example M/5 hydrochloric acid may be used as an initial eluting agent to effect substantial removal of the nickel and zinc. Any cobalt which may be present adsorbed on the resin will ordinarily remain on the resin during elution with the aqueous alkali metal cyanide, the dilute aqueous mineral acid and the organic solvent elutions and may be removed from the resin, after the gold has been recovered, by elution with an aqueous 2 M potassium thiocyanate solution. Any silver left on the resin will also be eluted with the cobalt leaving the resin ready for a further adsorption and elution cycle.

Where copper is present in great excess of the gold a preliminary elution with 2 M sodium cyanide should be carried out to remove the majority of the copper held on the resin, prior to any elution with dilute aqueous inorganic acid, since a preliminary acid elution has been found to render difficult any subsequent elution of the copper.

In carrying the invention into effect for the recovery of gold from cupriferous ore, the ore, finely ground may be leached with aqueous sodium cyanide solution of suitable strength, and the resulting liquor, together with washings of the leached pulp, is passed through a column of a strongly basic anion exchange substance, the latter being used in amount calculated to adsorb the total heavy metal complex cyanides in solution. The anion exchange substance may then be eluted with the solutions referred to above according to the impurities present and, water washing of the anion exchange substance may follow each elution. Elution with the acidified organic solvent may then follow to recover the gold. Alternatively, where the quantity of gold is small, elution may be carried out to remove any impurities such as copper, iron, nickel and zinc, but leaving the gold on the anion exchange substance, and after a water wash of the column, passing in a further quantity of gold bearing liquor from another batch of ore and again eluting the impurities. The cycle of operation may be repeated a number of times to build up a quantity of adsorbed gold which may then be treated with the acidified organic solvent to remove the accumulated gold, and if necessary the anion exchange substance finally rendered suitable for a further cycle of operation by passing a 2 M potassium thiocyanate solution through it and finally washing with water.

The following are examples of preferred ways of carrying the invention into effect.

*Example 1*

A cyanide solution for treatment according to the invention had the following composition:

| | Mg. per litre |
|---|---|
| Gold | 10.34 |
| Silver | 1.04 |
| Copper | 18.78 |
| Nickel | 35.20 |
| Iron | 0.56 |
| Zinc | 19.56 | in addition to 0.2% of free sodium cyanide. The solution was allowed to pass through a column of the anion exchange resin known as "Amberlite IRA-400" of grain size such that it passed B. S. sieve 20 and was retained on B. S. sieve 80, the resin being in the chloride form. The column contained 2 g. of resin and the solution was allowed to flow through at a rate of 200 ml./hr. Traces of gold were found in the eluate, after 2.1 litres of liquor had passed. The column was then eluted with 200 ml. or M/5 HCl followed by 100 ml. water. The column was then eluted with 100 ml. M-NaCN followed by 100 ml. water. A fresh quantity of the cyanide solution was allowed to flow through the column until break through of gold occurred again, that is after 1.6 litres had passed. The elution cycles with M/5 HCl and M-NaCN were repeated and a third adsorption cycle completed, requiring 1.4 litres of the cyanide solution. The elution with M/5 HCl and M-NaCN were repeated a third time and the column was then eluted with 150 ml. acetone containing 5% $H_2O$ and 5% HCl (d 1.18) followed by 100 ml. water. In the combined elutions with M/5 HCl 11 per cent of the copper, a trace of the iron, 98.2 per cent of the nickel and 95.5 per cent of the zinc was extracted with none of the silver or gold. The combined elutions with M-NaCN removed 44 per cent of the copper, 85 per cent of the iron, 1.2 per cent of the nickel, 3.5 per cent of the zinc with none of the gold or silver.

The elution with the acetone to which is added 5 per cent each of water and hydrochloric acid removed the remaining 45 per cent of the copper, 15 per cent of the iron, 0.6 per cent of the nickel, 1 per cent of the zinc together with 100 per cent of the silver and 99 per cent of the gold.

Elution of the column of "Amberlite IRA-400" containing adsorbed gold, silver, iron and copper cyanide complexes with acetone to which is added 5 per cent by volume each of hydrochloric acid and water, omitting the initial elution with sodium cyanide solution, resulted in only 85 per cent of the adsorbed gold being found in the elute, which contained also most of the copper and some of the iron. It has been observed that if copper and iron are not removed prior to elution of gold with the organic solvent, complex substances are formed on the ion exchange resin, which are very difficult to remove and they interfere with re-use of the resin.

The following example illustrates a form of the process of the invention which has been found satisfactory in treating ores of high copper content relative to gold.

*Example 2*

A sample of a silicified, mineralised greenstone having an average pyrite concentration of 3.5 per cent and a gold content of about 4 mg. per kilogramme yielded a cyanide extract containing per kilogramme of ore:

| | Mg. |
|---|---|
| Copper | 146 |
| Iron | 13 |
| Nickel | 7 |

The ore was bell milled dry to pass 100 mesh B. S. sieve and treated with a 0.1 per cent sodium cyanide solution containing 0.05 per cent calcium as oxide, one litre of the solution being used for each kilogramme of ore. The mixture was stirred for six hours and then allowed to stand for about twelve hours. The extract was separated from the pulp and the latter was washed with water equal in volume to half the leaching solution, the washings being added to the extract to give a pregnant liquor for treatment. The pregnant liquor was passed through a column of "Amberlite IRA-400" resin in chloride form 5 gm. of resin (dry weight) being used for every two kilogrammes of ore. The column of resin was washed with 20 ml. of water for each gramme of resin in the column. The column was then eluted with 50 ml. aqueous 2 M sodium cyanide solution for each gramme of resin and then again washed with a volume of water equal to that of the first washing. The 2 M sodium cyanide removed almost the whole of the copper, all of the iron and about one third of the nickel, leaving the gold on the resin. The resin was then treated with a further like quantity of pregnant liquor derived from a further like quantity of milled ore, followed by washing with water, elution with 2 M sodium cyanide and subsequent washing with water, the amounts of copper, nickel and iron removed by the sodium cyanide solution were similar to those of the first elution, and gold was retained on the resin. Further cycles of passing another batch of pregnant liquor through the column of resin, washing, eluting with 2 M sodium cyanide and washing with water may be carried out to build up gold content on the resin. After three such cycles approximately 1.7 per cent of the total copper in solutions employed remained on the resin, 67.4 per cent of the nickel, substantially no iron and all the gold. Elution of the resin with acetone to which is added 5 per cent hydrochloric acid (1.1 s. g.) in amount equal to 300 ml. for each 5 gm. of resin resulted on the removal of all the remaining copper, 11.2 per cent of the total nickel and 90.3 per cent of the gold. A water wash of the resin removed substantially all the residue of the nickel leaving only 0.4 per cent on the resin, and a further 5.3 per cent of the gold, leaving four per cent of the adsorbed gold on the resin.

The acidified acetone eluate containing 90 per cent of the gold was suitable for working up to separate the nickel. The following water wash could be separately worked up for such separation.

By increasing the number of cycles of adsorption and sodium cyanide elution, to obtain a larger quantity of gold on the resin the efficiency of recovery could be further increased.

The resin after the elution by the acidified acetone and the final water wash was left in condition for further cycles of operation.

Quantities per cent referred to in this specification and the claims are quantities by volume.

We claim:

1. A method of recovering gold adsorbed on an anion exchange resin as aurocyanide which comprises eluting the gold by means of an organic solvent containing a minor proportion of an inorganic acid.

2. A method of recovering gold adsorbed as aurocyanide on a strongly basic anion exchange resin together with impurities, especially copper and iron, which comprises eluting at least part of the impurities with an aqueous alkali metal cyanide solution, and then recovering gold by eluting the anion exchange resin with an organic solvent containing a minor proportion of an inorganic acid.

3. A method of recovering gold adsorbed as aurocyanide on a strongly basic anion exchange resin together with at least one of the metals copper, iron, nickel and zinc which comprises eluting the anion exchange resin with aqueous inorganic acid whereby to remove the greater part of the nickel and zinc and part of the copper, then eluting the anion exchange resin with aqueous alkali metal cyanide solution to remove copper, the greater part of the iron, and further nickel and zinc and then eluting the anion exchange resin with an organic solvent containing a minor proportion of inorganic acid whereby substantially the whole of the adsorbed gold and silver are removed.

4. A method of recovering gold from aqueous cyanide solution which comprises passing the solution into contact with a strongly basic anion exchange resin to bring about adsorption of aurocyanide by the said anion exchange resin, and eluting the anion exchange resin with an organic solvent containing a minor proportion of an inorganic acid to extract the gold.

5. A method according to claim 4 wherein the anion exchange resin with the adsorbed aurocyanide is first eluted with an aqueous alkali metal cyanide solution to extract part of any adsorbed copper or iron present and is then eluted with an organic solvent containing a minor proportion of an inorganic acid.

6. A method of recovering gold from aqueous cyanide solutions containing the same and other metals including copper, nickel, iron, zinc which comprises passing the solution into contact with a strongly basic anion exchange resin to bring about adsorption of aurocyanide on the anion exchange resin, eluting the latter with aqueous inorganic acid to extract the greater part of the nickel and zinc and some of the copper leaving gold and any silver present on the anion exchange resin, then eluting the anion exchange resin with aqueous alkali metal cyanide solution to extract some of the copper, the greater part of the iron and some nickel and zinc while leaving gold and any silver present on the anion exchange resin and then eluting the anion exchange resin with an organic solvent containing a minor proportion of inorganic acid to extract substantially all the gold and any silver and copper present.

7. A method of recovering gold from aqueous cyanide solutions which contain copper in substantially greater amount than the gold, which comprises causing the gold and copper to become adsorbed on a strongly basic anion exchange resin, eluting the adsorbate with alkali metal cyanide solution to extract the majority of the copper while leaving the gold on the anion exchange substance and then eluting the anion exchange resin with an organic solvent containing a minor proportion of acid to extract gold.

8. A method according to claim 7 wherein the alkali metal cyanide solution is substantially 2 M.

9. A method according to claim 7 wherein the organic solvent is acetone and the inorganic acid is hydrochloric acid.

10. A method according to claim 7 wherein the organic solvent is acetone to which is added substantially 5 per cent of hydrochloric acid (1.1 s. g.) and substantially 5 per cent of water.

11. A method of recovering gold from aqueous cyanide solution which comprises passing the gold containing cyanide solution through a mass of a strongly basic anion exchange resin to bring about adsorption of gold and metal impurities present on the substance, eluting the base exchange resin with aqueous alkali metal cyanide solution to extract at least part of the metal impurities, passing further aqueous gold containing cyanide solution through the said mass of anion exchange resin to cause further adsorption of gold on the said resin and again eluting the mass with an aqueous solution of an alkali metal cyanide to extract at least part of any metal impurities adsorbed, and repeating the adsorption and elution cycles to build up a quantity of adsorbed gold on the mass of anion exchange resin and finally after elution with aqueous alkali metal cyanide solution, extracting the gold by elution with an organic solvent containing a minor proportion of inorganic acid.

12. A method according to claim 11 wherein an elution of the mass of anion exchange resin by aqueous alkali metal cyanide solution is preceded by elution with dilute aqueous inorganic acid solution in cases where at least one of the metals zinc and nickel are present as impurities and the copper content of the gold containing aqueous cyanide solution is not of a higher order than that of the gold.

13. A method according to claim 11 wherein the aqueoue alkali metal cyanide solution is of 2 M concentration when the gold containing cyanide solution has a copper content of a higher order than the gold content.

14. A method according to claim 11 wherein the organic solvent is of the class consisting of acetone, ethyl acetate, ethyl alcohol, and methanol.

15. A method according to claim 11 wherein acetone is employed as organic solvent and the acetone contains substantially 5 per cent of hydrochloric acid (1.1 s. g.) and 5 per cent of water.

References Cited in the file of this patent

UNITED STATES PATENTS

| | | |
|---|---|---|
| 799,548 | Dupre | Sept. 12, 1905 |
| 2,648,601 | Byler et al. | Aug. 11, 1953 |

FOREIGN PATENTS

| | | |
|---|---|---|
| 132,931 | Australia | May 30, 1949 |

OTHER REFERENCES

"Report of Investigations No. 4374," Bureau of Mines, Jan. 1949, pages 5, 14 and 15.

Kunin, R. and Myers, R. J.: "Ion Exchange Resins," John Wiley and Sons, New York, N. Y. (1950), page 63.